United States Patent [19]

Kato et al.

[11] 4,249,227

[45] Feb. 3, 1981

[54] ENCLOSED SWITCHBOARD HAVING INSTRUMENTS NEEDED FOR REGULAR INSPECTION AND OPERATION MOUNTED ON A MIDDLE LEVEL DOOR

[75] Inventors: Yasuhiro Kato, Hachioji; Nobuo Sekiguchi, Tokorozawa; Sizuo Yosida, Fuchu, all of Japan

[73] Assignee: Tokyo Shibaura Electric Company Limited, Kawasaki, Japan

[21] Appl. No.: 20,738

[22] Filed: Mar. 15, 1979

Related U.S. Application Data

[63] Continuation of Ser. No. 857,976, Dec. 6, 1977, abandoned.

[30] Foreign Application Priority Data

Dec. 14, 1976 [JP] Japan .................. 51-166737

[51] Int. Cl.³ .............................................. H02B 1/04
[52] U.S. Cl. .................... 361/334; 361/338; 361/336; 73/431
[58] Field of Search .............. 73/431; 174/52 R, 59, 174/60; 361/331, 332, 334–339, 344, 356–360, 364, 365, 428, 429

[56] References Cited

U.S. PATENT DOCUMENTS

| | | | |
|---|---|---|---|
| 2,542,853 | 2/1951 | Wills | 361/338 |
| 2,856,450 | 10/1958 | Padgett | 174/52 R |
| 3,256,479 | 6/1966 | Edwards | 361/334 |
| 3,631,324 | 12/1971 | Jones | 361/334 |
| 3,824,860 | 7/1974 | Harden | 73/431 |
| 3,829,773 | 8/1974 | Nigg | 73/431 |

Primary Examiner—Gerald P. Tolin
Attorney, Agent, or Firm—Oblon, Fisher, Spivak, McClelland & Maier

[57] ABSTRACT

An enclosed switchboard in which an upper chamber and a lower chamber are formed within a switchboard frame in the form of a box for accommodating electrical apparatus such as circuit breakers. At the free surfaces of the frame facing the two chambers a top level door and a bottom level door facing the two chambers are mounted so as to be capable of being opened and closed separately from one another. A middle level door for the mounting of instruments is mounted between the top level door and bottom level door, and instruments needed for regular inspection and control, for instance meters, operating switches, indicator lamps and the like, are mounted on the door surface of the middle door.

9 Claims, 7 Drawing Figures

TO LOAD BUS

TO LOAD BUS

ENCLOSED SWITCHBOARD HAVING INSTRUMENTS NEEDED FOR REGULAR INSPECTION AND OPERATION MOUNTED ON A MIDDLE LEVEL DOOR

This is a continuation of application Ser. No. 857,976 filed Dec. 6, 1977, and now abandoned.

BACKGROUND OF THE INVENTION

This invention relates to a two-stage type enclosed switchboard, and more particularly to the arrangement of instruments on the switchboard surface and the division and structure of the doors.

In recent years the apparatus that is accommodated in enclosed switchboards or metal-enclosed switchgear has been made progressively smaller, as have enclosed switchboards and two-stage or two-tier integrated enclosed switchboards accommodating two circuit breakers one above the other. It is no exaggeration to say that most of the enclosed switchboards that are now being made are of this kind. On the other hand, in two-stage integrated enclosed switchboards the door has usually been divided into two parts, one above the other, and the instruments for the protection and inspection of the respective apparatus have now been mounted on the door surfaces. But in this case, the space for mounting the instruments has been reduced to half of what it was and therefore the arrangement of the meters and relays, operating switches, lamps, testing terminals and the like has become a problem. As regards the operating switches, for example, if these are mounted on the top door they are too high and therefore cannot be reached by hand and this causes trouble, whereas if they are mounted on the lower door they are too low and as a result it is not easy to operate them. This does not apply only to the operating switches; the same can be said of the meters, lamps, testing terminals and the like. On the top door these instruments must be mounted at the bottom, and on the bottom door these instruments must be mounted at the top. Accordingly, even if the top and bottom circuits are exactly the same, the apertures in the doors and the mounting and arrangement of the instruments are different and this is, therefore, inconvenient from the point of view of standardization.

SUMMARY OF THE INVENTION

An object of this invention is to provide an enclosed switchboard in which the instruments needed for regular inspection and operation can be arranged in a middle position so that inspection is easy and operation is easy but standardization during manufacture is not made difficult.

This and other objects are achieved by an enclosed switchboard which comprises an upper apparatus accommodating chamber and a lower apparatus accommodating chamber formed within a switchboard frame and accommodating respective electrical apparatus; a top level door and a bottom level door mounted at the free surfaces of the abovementioned frame which face these two chambers, so as to be capable of being opened and closed separately from one another; and a middle level door which is provided between the top level door and bottom level door and has holes provided in its door wing for mounting instruments needed for regular inspection and operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6 (a) and (b) are oblique views showing examples of blank panels mounted on unwanted mounting holes shown in FIG. 5.

DESCRIPTION OF THE PREFERRED EMBODIMENTS

Figure 1A:
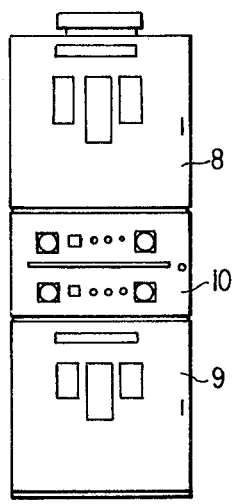
FIGS. 1 (a) and (b) are a front view and a side view showing one embodiment of the enclosed switchboard of this invention.
Figure 1B:
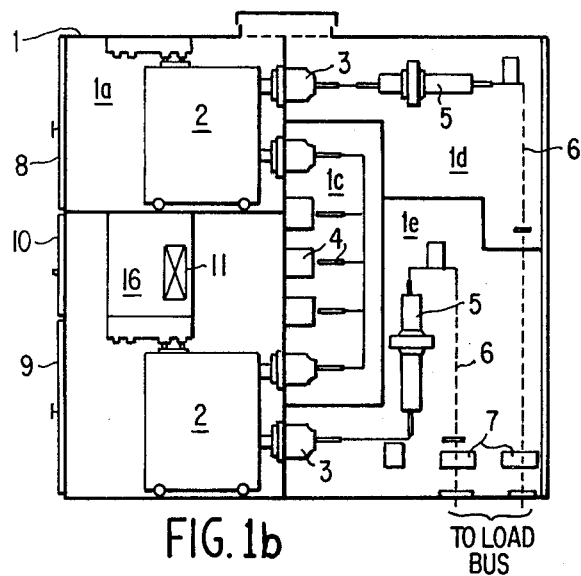

Referring now to the drawings, wherein like reference numerals designate identical or corresponding parts throughout the several views, and more particularly to FIG. 1 thereof, 1 is a switchboard frame of an enclosed switchboard, and 2 are circuit breakers provided respectively in an upper apparatus accommodating chamber 1a and a lower apparatus accommodating chamber 1b of the abovementioned switchboard frame 1. 3 are main circuit disconnector units connectable to and disconnectable from the circuit breakers 2. 4 are bus line conductors connected to a power source bus line not shown in the drawing, and accommodated in the rear bus line chamber 1c within the switchboard frame 1, 5 is a current transformer, 6 are cables, and 7 are zero phase current transformers; these are accommodated in the rear bus line chambers 1d and 1e within the switchboard frame 1 as shown in FIG. 1(b). 8 is a top level door and 9 is a bottom level door; these are provided separately in the open parts of the front surface of the switchboard frame 1, facing the abovementioned accommodating chambers 1a and 1b. 10 is a middle level door arranged between the abovementioned top level and bottom level doors 8 and 9; instruments needed for regular inspection and control are mounted in the middle level door. 11 is a control bus line which is arranged in a position facing the abovementioned middle level door 10, within the switchboard frame 1.

Figure 2A:
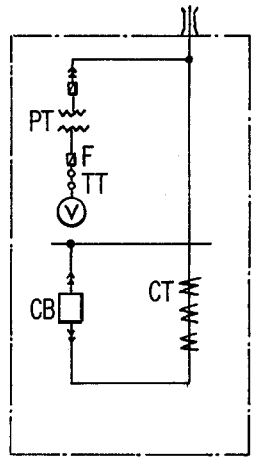
FIGS. 2 (a) and (b) and (c) are single line connection diagrams showing circuit structures of various enclosed switchboards to which the present invention is applied.
Figure 2B:
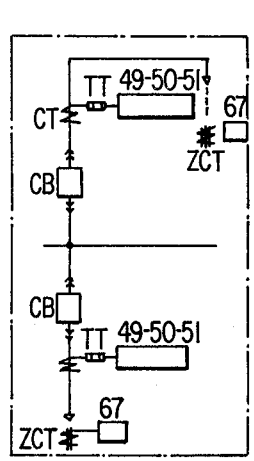
Figure 2C:
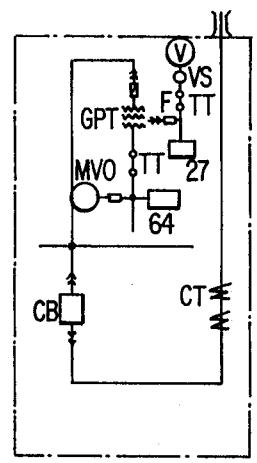
Figure 3A:
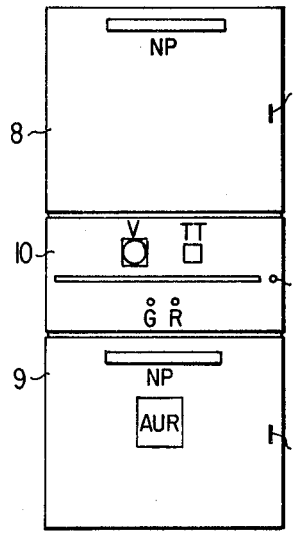
FIGS. 3 (a), (b) and (c) are front views of enclosed switchboards showing examples of the respective circuit structures shown in FIGS. 2 (a), (b) and (c) applied to this invention.
Figure 3B:
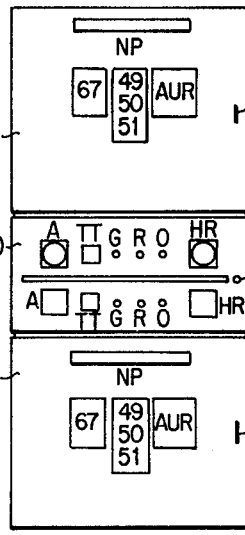
Figure 3C:
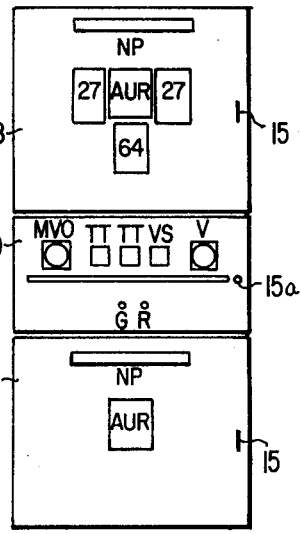

The following is a description of the structure set forth above, applied to various switchboards. An enclosed switchboard can be one of three kinds, according to the way in which it is used, that is to say a main voltage transformer secondary unit for receiving current, as shown in FIG. 2 (a), a switchboard unit for distribution as shown in FIG. 2 (b), or, if needed a bus line link unit for linkage between "banks", as shown in FIG. 2 (c), and by suitably combining and arranging them it is possible to build up a bank. In each of these units the respective switchboard surface instrument arrangement is as shown in FIGS. 3 (a), (b) and (c); firstly, the instruments mounted on the top level and on the bottom level doors are restricted to the protective relays (designated by the numerals 67, 49, 50, 51, 27 and 64) and the auxiliary relays (AUR) which do not have to be frequently operated and inspected. These relays are not changed whenever this is convenient because of the manner of operation of the "user", and therefore they can be fixed for each respective unit. Also, as regards the high positions that cannot be reached by hand, and as regards the low positions also, there is no problem in everyday operation, and there is no objection to a structure in which the top level and bottom level doors are exactly the same as regards the mounting positions. Accordingly, standardization is effected easily for each individual unit. On the other hand, the instruments mounted on the middle level door are restricted to instruments other than those set forth above, that is to say to instruments needed for everyday inspection or operation, for example ammeters A, voltmeters V, switch V.S., lamps G.R.O., testing terminals T.T. and the like. Accordingly, as regards frequent inspection and operation also, operation is easy and a structure can be produced that is outstandingly good as regards human engineering also.

Also, these middle stage doors 10 do not have to be opened except for inspection and maintenance of the control circuit parts accommodated at the back of these doors, and therefore those doors do not have to have elaborate handles 15 like those provided on the top and bottom level doors 8 and 9, and it is only necessary to use decorative screws 15a or the like. Also, when the circuit breakers 2 are being taken out or put in there is no need to open these middle doors, and therefore any chance of damage to the instruments when the circuit breakers 2 are being taken out or put in can be eliminated.

Figure 4:
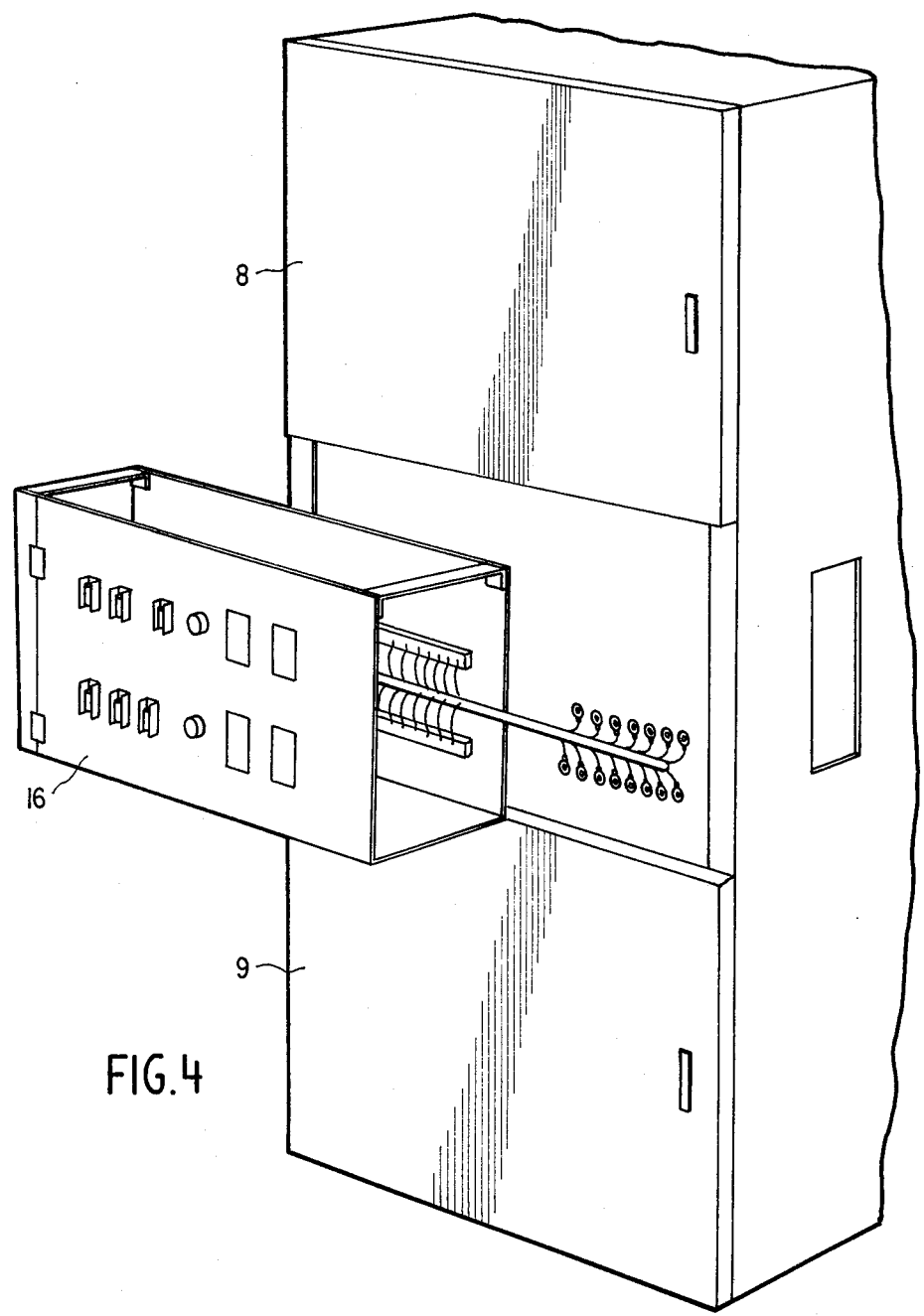
FIG. 4 is an oblique view showing an example of a control parts mounting block used in the present invention.

A mounting block 16 for control circuit parts is formed inside the switchboard frame 1 facing the abovementioned middle level door 10. This mounting block 16 may be so constructed that it can be taken out of the switchboard, as shown in FIG. 4. If this is done, the mounting of parts such as fuse receptacles and knife switches does not have to be performed inside the narrow switchboard; the unit assembled outside can be pushed in and the work of manufacture can be made still easier.

Figures 5, 6A, 6B:
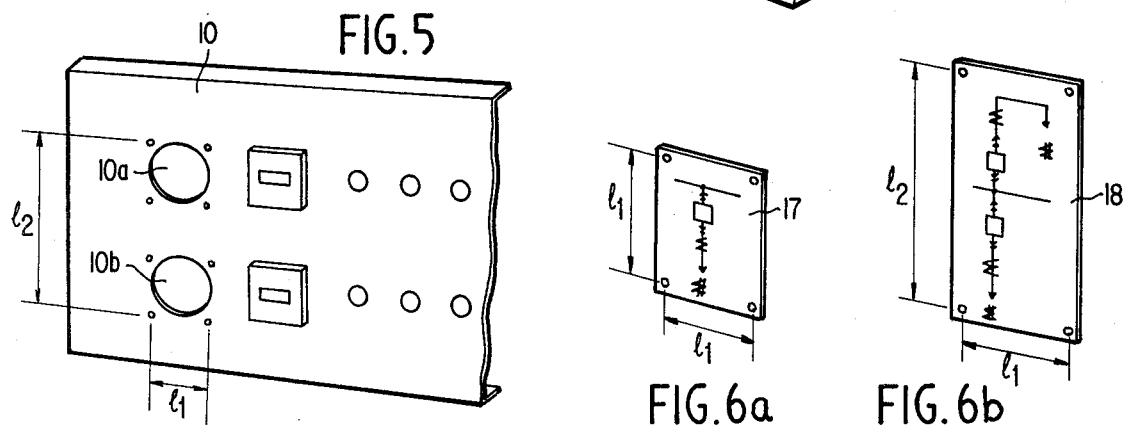
FIG. 5 is a perspective view showing an example of apertures in the middle level door used in the present invention.
Figure 7:
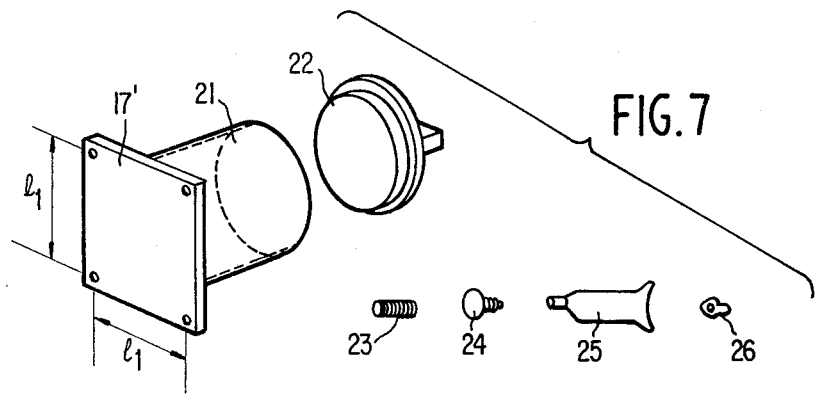
FIG. 7 is an oblique view showing a container mounted on an unwanted mounting hole shown in FIG. 5, and spare parts accommodated in that container.

As regards the middle level door 10, the manner of operation of the "user" gives rise to changes in the manner in which the instruments are mounted. In FIG. 5 the standardization of this middle level door has been taken into consideration and an example is shown in which, for instance, ammeters are not required. In this case the aperture in the middle level door 10 have been changed as required, and this is therefore inconvenient from the point of view of standardization, and therefore it is better to block these unwanted holes 10a and 10b simply and neatly and in a way which is useful in practice. For this purpose indicator plates 17 and 18 in which the circuit structure of the unit is depicted by single connections as shown in FIG. 6a and FIG. 6b are employed; these are suitably used for each aperture in the door and block the abovementioned apertures 10a and 10b. As regards this, an enclosed switchboard two-stage integrated structure is used, whereby the circuit structure of the unit becomes complicated. Therefore, it is extremely useful to show the internal structure simply by means of the abovementioned single connection indicator plates 17 and 18. FIG. 7 shows another way of blocking these holes 10a and 10b. A container having the same diameter as an ammeter is used on the rear side of a blank plate 17'. That is to say, 21 is a tube, 22 is a cover of the tube 21, and spare parts such as a fuse 23, a lamp 24, contact grease 25, an AMP terminal 26 and other such parts can be accommodated in this tube. This arrangement is still more useful if combined with the one shown in FIGS. 6 (a) and (b).

Figure 8A:
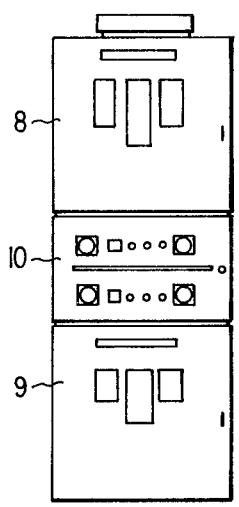
FIGS. 8 (a) and (b) are a front view and a side view showing an enclosed switchboard according to another embodiment of this invention.
Figure 8B:
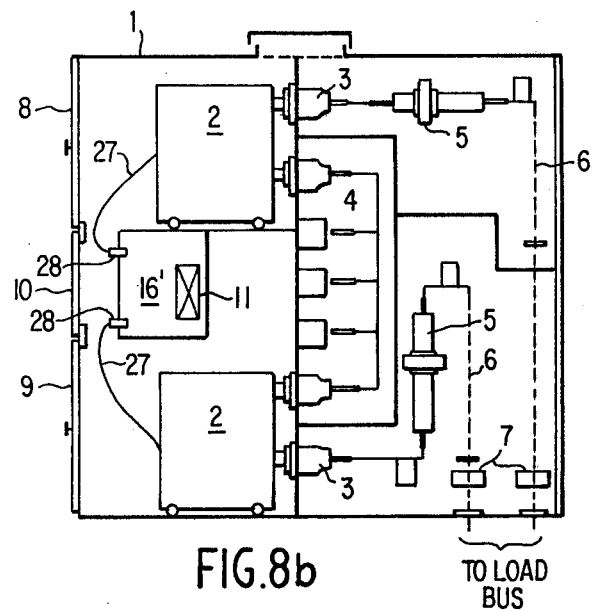
Figure 9:
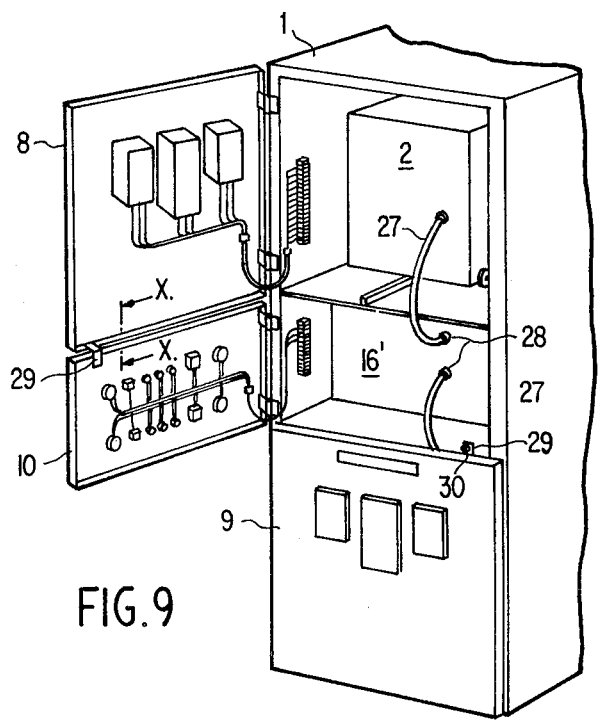
FIG. 9 is an oblique view showing the state in which the top level door and the middle level door of the enclosed switchboard shown in FIG. 8 are open.
Figure 10:
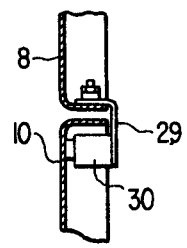
FIG. 10 is a view in section along the line X—X of FIG. 9, as seen in the direction of the arrows.

FIGS. 8 (a) and (b) are another embodiment of this invention. The control circuits of the circuit breakers 2 are taken out by means of cables 27, and plugs 28 provided at the ends of these cables are releasably connected to the instrument mounting block 16' of the middle stage. In this case when, for instance, the top level circuit breaker 2 is being taken out, if the top level door 8 is opened then the middle level door 10 must also be opened at the same time, as shown in FIG. 9, and when the bottom level circuit breaker 2 is being taken out, the bottom level and middle level doors 9 and 10 must open at the same time. As a means for making this possible, the structure is made such that as shown in FIG. 10 a catch 29 and a permanent magnet 30 are secured to the top level door 8 (or the bottom level door 9), and this is attracted to the inside of the middle level door 10.

Because of this arrangement, the middle level door 10 follows any opening movement of the top level or bottom level door 8 or 9. Moreover, if necessary it is also possible to open only the middle door 10 by itself.

As described above, when the present invention is used standardization of the top and bottom level doors becomes possible and as regards inspection and operation, also, an enclosed switchboard can be obtained which is excellent from the point of view of human engineering, besides which the standardization enables the wiring to be made in blocks and therefore there is the advantage that an enclosed switchboard can be obtained of which the quality is stable and the price is low.

Obviously, numerous modifications and variations of the present invention are possible in light of the above teachings. It is therefore to be understood that within the scope of the appended claims, the invention may be practiced otherwise than as specifically described herein.

What is claimed to be new and desired to be secured by Letters Patent of the United States is:

1. An enclosed switchboard, comprising:
   a switchboard frame having formed therein an upper apparatus accommodating chamber and a lower apparatus accommodating chamber, said chambers containing electrical apparatus,
   a top level door and a bottom level door mounted at the free surfaces of said frame facing the two chambers so as to be capable of being opened and closed separately from one another, said top and bottom level doors having mounted thereon first instruments which are restricted to instruments that do not indicate the operating state of the accommodating electrical apparatus; and a middle level door provided between said top level door and bottom level door and having mounting holes provided in its door surface, second instruments restricted to the type needed for regular inspection and operation being mounted in said mounting holes and catches causing the middle level door to follow the opening movement of either the upper level door or the lower level door.

2. The enclosed switchboard recited in claim 1 wherein:

the second instruments mounted in the middle level door include an operating switch and an indicator lamp.

3. The enclosed switchboard recited in claim 1 wherein: said second instruments include a meter.

4. The enclosed switchboard recited in claim 1 wherein:

the mounting holes for second instruments mounted on the middle level door include a hole covered by a blank plate on which a circuit diagram is inscribed.

5. The enclosed switchboard recited in claim 1 wherein:

the middle level door has an instrument mounting hole covered by a blank plate, the blank plate having a spare parts and accessories container tube fitting into the instrument mounting hole.

6. The enclosed switchboard recited in claim 1 including:

a mounting block for control circuit parts mounted in the switchboard frame facing the middle level door.

7. The enclosed switchboard recited in claim 6 wherein:

said mounting block for control circuit mounting parts is removable from the switchboard frame.

8. The enclosed switchboard recited in claim 6 wherein:

control circuits of electrical apparatus accommodated in the upper and lower apparatus accommodating chambers can be plugged into the mounting block for control circuit parts.

9. An enclosed switchboard, comprising:

a switchboard frame having formed therein an upper apparatus accommodating chamber and a lower apparatus accomodating chamber, said chambers containing electrical apparatus, a top lever door and a bottom level door mounted at the free surfaces of said frame facing the two chambers so as to be capable of being opened and closed separately from one another, said top and bottom level doors having mounted thereon first instruments which are restricted to instruments that do not indicate the operating state of the accomodating electrical apparatus; and a middle level door provided between said top level door and said bottom level door and having mounting holes provided in its door surface, second instruments restricted to the type needed for regular inspection and operation being mounted in said mounting holes; and said electrical apparatus accommodated in said switchboard frame comprises: circuit breakers, a control frame mounted in the switchboard frame facing the middle level door for accommodating circuitry for the circuit breakers, and a catch connected to one of the top and bottom level doors causing the middle level door to follow the opening movement of the one of the top and bottom level doors.

* * * * *